(12) United States Patent
Ruzycki et al.

(10) Patent No.: US 12,304,145 B2
(45) Date of Patent: May 20, 2025

(54) MAGNETIC STEREOLITHOGRAPHY PRINT HEAD, STEREOLITHOGRAPHY PRINTER, AND METHOD OF STEREOLITHOGRAPHY PRINTING

(71) Applicant: UNIVERSITY OF FLORIDA RESEARCH FOUNDATION, INCORPORATED, Gainesville, FL (US)

(72) Inventors: Nancy J. Ruzycki, Gainesville, FL (US); John Hentschel, Gainesville, FL (US); Abbiy Telahun, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 0 days.

(21) Appl. No.: 18/012,302

(22) PCT Filed: Jun. 28, 2021

(86) PCT No.: PCT/US2021/039393
§ 371 (c)(1),
(2) Date: Dec. 22, 2022

(87) PCT Pub. No.: WO2021/263234
PCT Pub. Date: Dec. 20, 2021

(65) Prior Publication Data
US 2023/0271383 A1 Aug. 31, 2023

Related U.S. Application Data

(60) Provisional application No. 63/044,548, filed on Jun. 26, 2020.

(51) Int. Cl.
*B29C 64/245* (2017.01)
*B29C 64/209* (2017.01)
(Continued)

(52) U.S. Cl.
CPC .......... *B29C 64/245* (2017.08); *B29C 64/209* (2017.08); *B29K 2995/0008* (2013.01); *B33Y 10/00* (2014.12); *B33Y 30/00* (2014.12)

(58) Field of Classification Search
None
See application file for complete search history.

(56) References Cited

U.S. PATENT DOCUMENTS

| 2013/0164500 A1 | 6/2013 | Kasperchik et al. |
| 2017/0092400 A1 | 3/2017 | Bharadwaj |

(Continued)

FOREIGN PATENT DOCUMENTS

| KR | 20190009964 A | * | 1/2019 |
| WO | 20150188175 A1 | | 12/2015 |
| WO | 20190239359 A2 | | 12/2019 |

OTHER PUBLICATIONS

Autodesk Ember 3D printer, Build Arm Teardown, Feb. 12, 2016, https://www.youtube.com/watch?v=Bivq-m0tr9o&t=17s (Year: 2016).*

(Continued)

*Primary Examiner* — Timothy Kennedy
(74) *Attorney, Agent, or Firm* — Timothy H. Van Dyke; Wolter Van Dyke Davis, PLLC

(57) ABSTRACT

An apparatus, including: a print head (124) including: an attachment (126) that is configured to be attached to a movable carriage of a stereolithography 3D printer (SLA printer); and when the print head is installed on the movable carriage: a build platform (202) having a bottom surface (146) that faces downward, a front surface (162) that faces a front of the SLA printer, a rear surface (166) that faces a (Continued)

rear of the SLA printer, and side surfaces (174, 176) connecting the front surface to the rear surface; and at least one magnet (152) secured to the print head.

13 Claims, 6 Drawing Sheets

(51) Int. Cl.
*B33Y 10/00* (2015.01)
*B33Y 30/00* (2015.01)

(56) References Cited

U.S. PATENT DOCUMENTS

| | | |
|---|---|---|
| 2017/0136699 A1 | 5/2017 | Erb et al. |
| 2017/0236639 A1 | 8/2017 | Pieper et al. |
| 2018/0027616 A1* | 1/2018 | Rios ................ B22F 12/13 219/603 |
| 2019/0061335 A1 | 2/2019 | Schmehl et al. |
| 2020/0180213 A1* | 6/2020 | Blair ................ B29C 64/20 |

OTHER PUBLICATIONS

Aguilera, Development of a Material Jetting 3D Printer with Magnetic Orientation Capabilities, Thesis, University of Alberta, 2018, 147 pages (Year: 2018).*
English machine translation of KR 20190009964. retrieved from USPTO database Jan. 17, 2025 (Year: 2025).*
Search Report & Written Opinion, PCT/US2021/039393, mailed Nov. 8, 2021, 9 pages.
Chatzipirpiridis, George et al., "3D Printing of Thermoplastic Soft- and Hard-Magnetic Composites: Magnetically Tuneable Architectures and Functional Devices", Adv. Intell. Syst, 2019, 8 pages.
Instructables Workshop, "How to Tune Ember's Print Setting for New Resins", Autodesk.com, 2021, 20 pages.
Palmero, Ester Maria et al., "Magnetic-Polymer Composites for Bonding and 3D Printing of Permanent Magnets", IEE Transactions of Magnetics, Feb. 2019, vol. 55, No. 2, 4 pages.
Palmero, Ester M. et al., "Development of permanent magnet MnAlC/polymer composites and flexible filament for bonding and 3D-printing technologies", Science and Technology of Advanced Materials, 2018, vol. 19, No. 1, pp. 465-473.
Williamson, D. Scott, "3D Printing PLA on a flexible metal build plate", Workshop 88, Feb. 5, 2017, 11 pages.

* cited by examiner

MAGNETIC STEREOLITHOGRAPHY PRINT HEAD, STEREOLITHOGRAPHY PRINTER, AND METHOD OF STEREOLITHOGRAPHY PRINTING

FIELD OF THE INVENTION

The invention relates to a stereolithography printer having a print head that aligns magnetic particles in a resin composition used to print a layer.

BACKGROUND

In a stereolithography 3D printer (SLA printer), a print head is lowered onto a photosensitive resin or resin composition in a reservoir. A layer of the resin is selectively irradiated with light. The selectively irradiated parts of the layer of resin solidify onto the print head in response to the irradiation. The layer forms one layer of many layers of a component. The print head is raised by a thickness of the layer and the process is repeated on the prior layer until all the layers of the component are so formed.

There are instances when it is desirable for the resin to be a resin composition having particles suspended therein. There are also instances when it is desirable for the particles to be oriented in a particular direction for a variety of reasons. Particles that are aligned along a particular direction may, for example, result in a layer that is stronger in tension along the particular direction. Such a layer may also mitigate crack propagation in directions transverse to the particular direction.

Prior art SLA printers propose various schemes for accomplishing this. One method disposes magnetically response particles in the resin composition and aligns the magnetically responsive particles by applying a magnetic field to the area of the resin composition being irradiated when printing the layer. However, these are understood to be complex arrangements that may not be fully developed. Hence, there is room in the art for improvement.

SUMMARY

In a first example embodiment, the disclosure provides a print head with: an attachment that is configured to be attached to a movable carriage of a stereolithography 3D printer (SLA printer); and when the print head is installed on the movable carriage: a build platform comprising a bottom surface that faces downward, a front surface that faces a front of the SLA printer, a rear surface that faces a rear of the SLA printer, and side surfaces connecting the front surface to the rear surface. The print head further includes at least one magnet secured to the print head.

In a second example embodiment, disclosed is a stereolithography 3D printer having the print head disclosed herein.

In a third example embodiment, disclosed is a method of SLA printing that includes: positioning the print head of the SLA printer onto a resin composition, wherein the resin composition comprises magnetically responsive particles; aligning the magnetically responsive particles in the resin composition with a magnetic field generated by the at least one magnet; and SLA printing the resin composition comprising the magnetically responsive particles to form a solid layer comprising aligned magnetically responsive particles.

BRIEF DESCRIPTION OF THE DRAWINGS

The invention is explained in the following description in view of the drawings that show.

DETAILED DESCRIPTION

The present inventors have devised a unique and innovative print head and associated SLA printer that enables alignment of magnetically responsive particles in a resin composition when printing a layer of the resin composition. The print head is simple and inexpensive, and the principle can be used with a variety of different SLA printers and print heads. The inventors have also developed a resin composition suitable for such printing. In addition, the inventors have identified certain parameters that can be adjusted to optimize printing with the print head and resin compositions.

Figure 1:
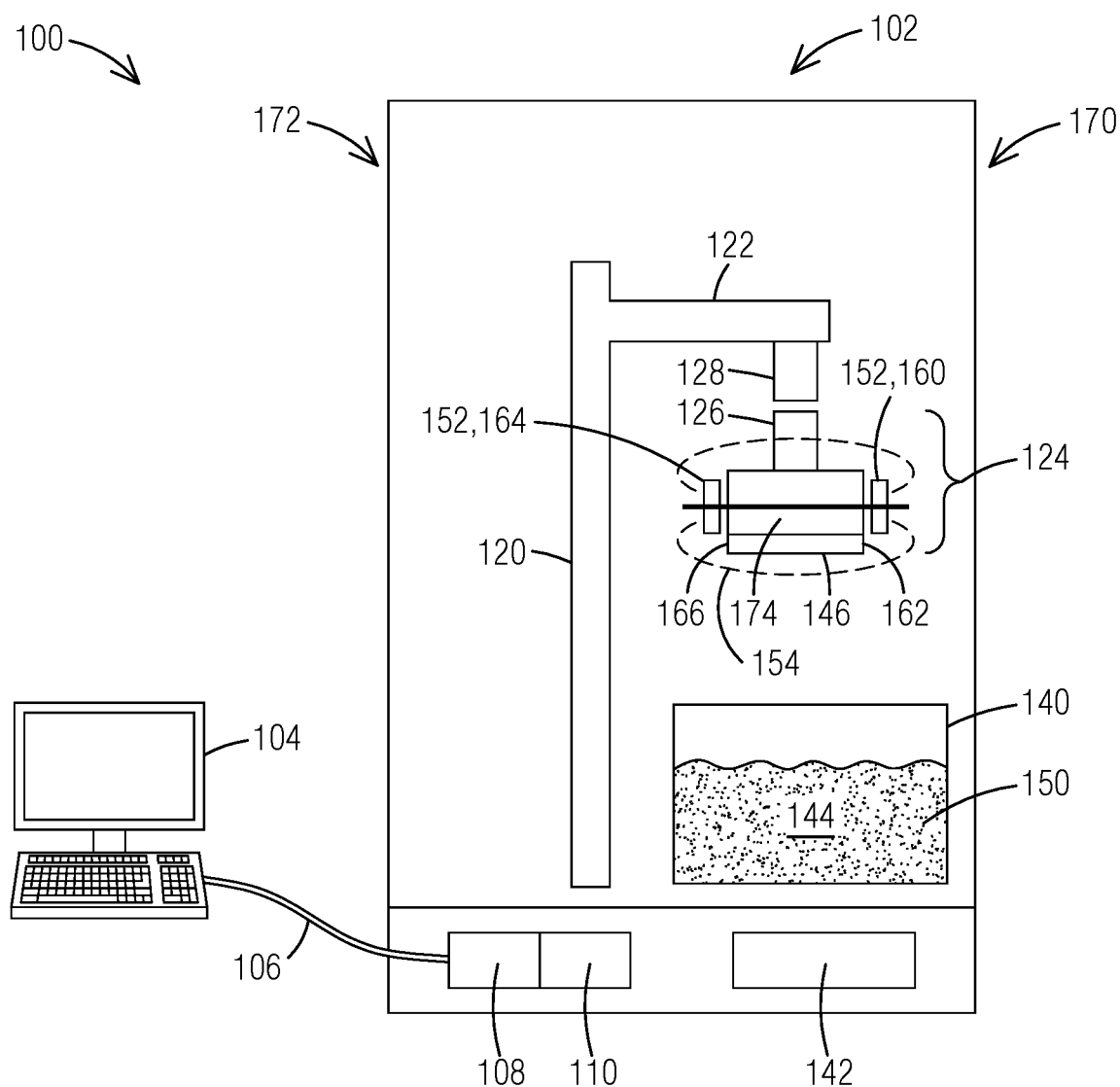
FIG. 1 is a schematic illustration of a stereolithography (SLA) printer arrangement.

FIG. 1 is a schematic illustration of a stereolithography (SLA) printer arrangement 100 including an SLA printer 102 and an optional computer 104 in data communication 106 with a controller 108 in the SLA printer 102 and through which parameters of the SLA printer 102 can be adjusted. The SLA printer 102 has an interface 110 through which the parameters can also be adjusted.

The SLA printer 102 includes, inter alia, a track 120 along which a moveable carriage 122 can translate vertically, and a print head 124. The print head 124 includes an attachment 126 that connects to an associated receiver 128 on the moveable carriage 122. As such, the print head 124 moves vertically with the moveable carriage 122. The SLA printer 102 further includes a reservoir 140 that may be transparent and a light arrangement 142 configured to selectively irradiate a resin composition 144 disposed in the reservoir 140.

During SLA printing, a bottom surface 146 of the print head 124 is lowered onto the surface of the resin composition 144. The light arrangement 142 selectively irradiates a layer of the resin composition adjacent the print head 124. This irradiation solidifies the selectively irradiated portions of the layer which are adheres to the bottom surface 146. This completes one layer of a print job. The next layer is printed by raising the print head 124 by the thickness of the just-printed layer so the bottom of the just-printed layer rests on the resin composition. The light arrangement 142 again selectively irradiates another layer of the resin composition adjacent the bottom of the just-printed layer. This irradiation solidifies the selectively irradiated portions of the other layer which are adhere to the bottom of the just-printed layer, thereby completing the second layer of the print job. This process is repeated until all layers of the print job are completed. For each print job, there may be a first layer, a burn in layer, and several model layers. Each model layer represents a respective layer of the component.

The SLA printer 102 disclosed herein is configured to align magnetically responsive particles 150 suspended in the resin composition 144 during the print process. To do this, at least one magnet 152 is secured to the print head 124. The at least one magnet 152 generates a magnetic field 154 capable of aligning the magnetically responsive particles 150 in the resin composition 144 when the bottom surface 146 of the print head 124 rests on the resin composition. This alignment is maintained during the printing process because the magnetic field is applied throughout the print process. Consequently, when the light arrangement 142 selectively irradiates and solidifies the layer of resin composition 144, the magnetically responsive particles disposed in the resin composition 144 and aligned with the magnetic field 154 maintain their orientation as they become part of the solidified layer.

The at least one magnet 152 may be a permanent magnet, an electromagnet, or a combination thereof. In an example embodiment, the at least one magnet 152 is an N52 type magnet. An N52 magnet is a neodymium magnet grade with an energy product or BHMax of 52 Mega-Gauss Oersteds. In the example embodiment, this type of magnet provides a proper balance between generating a magnetic field 154 that is strong enough to align the magnetically responsive particles 150 but not too strong. Magnetic fields that are too strong may interfere with electronics associated with the SLA printer 102 and/or may tend to draw the magnetically responsive particles 150 up from the resin composition 144.

In the embodiment shown, the at least one magnet 152 includes at least one front magnet 160 disposed on a front surface 162 of the print head 124 and at least one rear magnet 164 disposed on a rear surface 166 of the print head 124. The front surface 162 faces a front 170 of the SLA printer. The rear surface 166 faces a rear 172 of the SLA printer 102. Side surfaces 174, 176 connect the front surface 162 to the rear surface 166.

Figure 2:
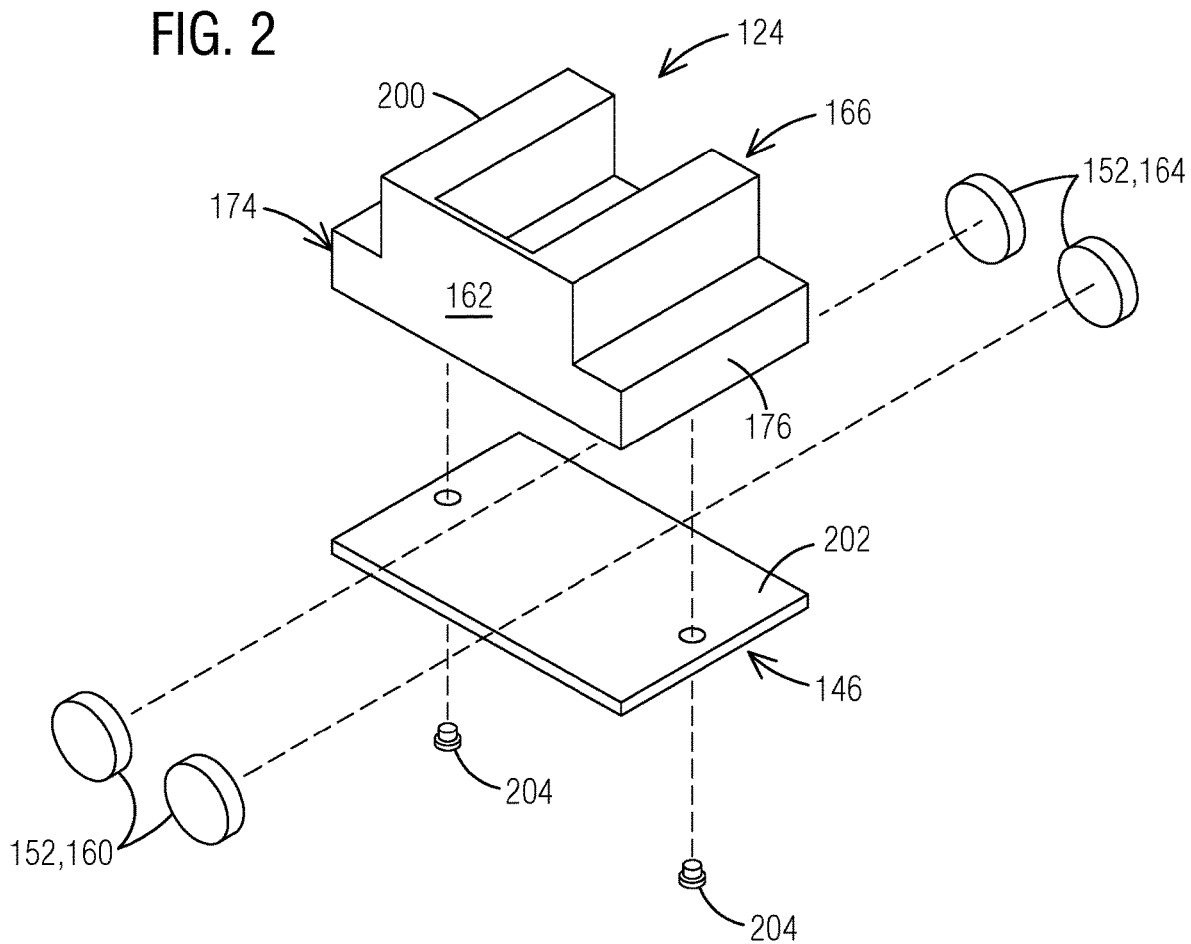
FIG. 2 and FIG. 3 are schematic illustrations of an example embodiment of a print head of the SLA printer of FIG. 1.

FIG. 2 is an exploded schematic illustration of an example embodiment of a print head 124 of the SLA printer 102 of FIG. 1. In this example embodiment, the print head 124 includes a print head body 200, a build platform 202 that defines the bottom surface 146, two front magnets 160, and two rear magnets 164. The build platform 202 may be secured to the print head body 200 via fasteners 204. The print head body 200 may be solid or hollow. If hollow, the print head body 200 may interfere less with the magnetic field 154 generated by the at least one magnet 152.

Figure 3:
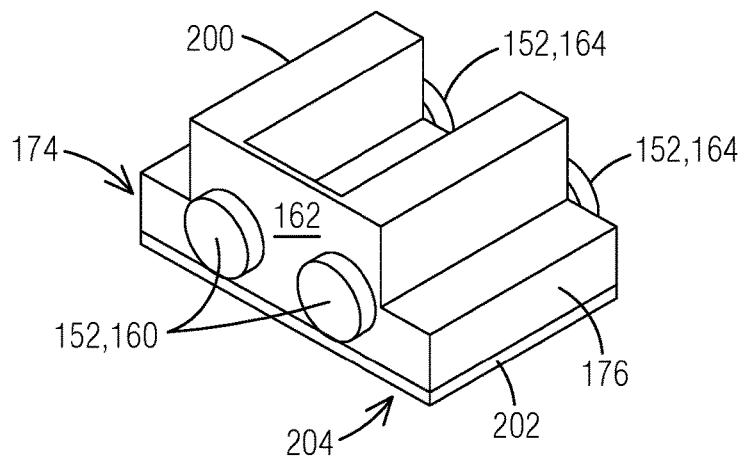
Figure 4:
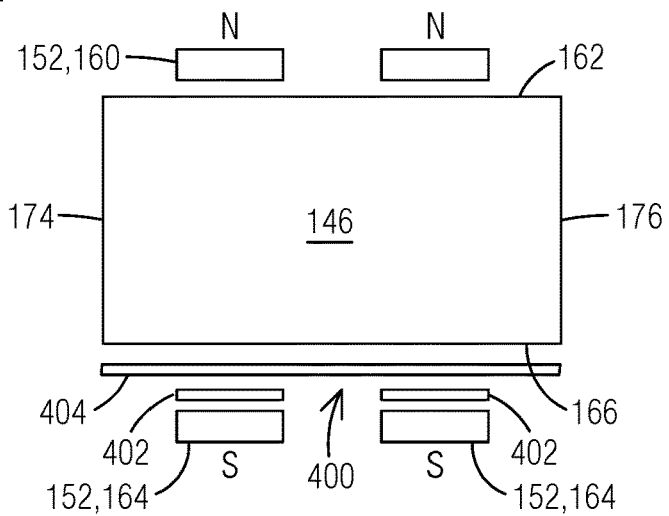
FIG. 4 through FIG. 9 are schematic illustrations of various example embodiments of the print head of the SLA printer of FIG. 1.

FIG. 3 is a schematic illustration of an example embodiment of a print head 124 of FIG. 2 in an assembled condition.

FIG. 4-FIG. 9 are schematic illustrations of various example embodiments of the print head of the SLA printer of FIG. 1. In the example embodiment of FIG. 4, there are two front magnets 160 that are evenly spaced and two rear magnets 164 that are evenly spaced. In this example embodiment, the north poles (N) and the south poles (S) are all positioned the same way. In this example embodiment, the front magnets 160 are adhered to the front surface 162 using an adhesive. An example adhesive, not meant to be limiting, is cyanoacrylate. In this example embodiment, the rear magnets 164 are secured to the print head 124 via a releasable connection 400. The releasable connection 400 includes a first half 402 and a second half 404 that releasable secured to the first half 402. An example releasable connection could be a hook and loop connection such as Velcro®. Another example includes double sided tape. The releasable connection 400 can be configured such that the first half 402 is a strip/patch that is larger than actually needed to secure the rear magnets 164 in the selected positions. Each second half 404 is simply as large as needed to secure a respective rear magnet 164 to the first half 402. Because the first half 402 covers a large portion or all of the rear surface 166, the rear magnets 164 can be removed from the position shown and repositioned as desired anywhere along the rear surface 166. The releasable connection 400 can be used for any magnet or magnets of the at least one magnet 152.

Figure 5:
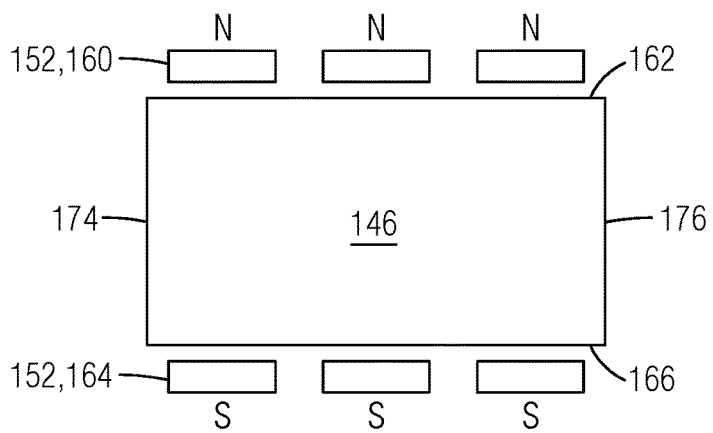
Figure 6:
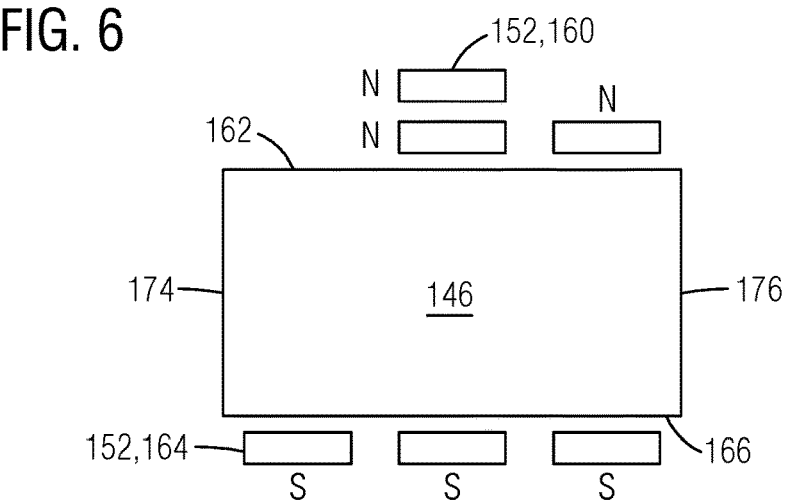

In the example embodiment of FIG. 5, there are three front magnets 160 that are evenly spaced and three rear magnets 164 that are evenly spaced. In the example embodiment of FIG. 6, there are three front magnets 160 that are unevenly spaced and three rear magnets 164 that are evenly spaced. In this example embodiment, two of the front magnets 160 are stacked on each other. Two or more magnets can be stacked in any location and pattern. The number of magnets in each stack can be the same or different from the number in another stack.

Figure 7:
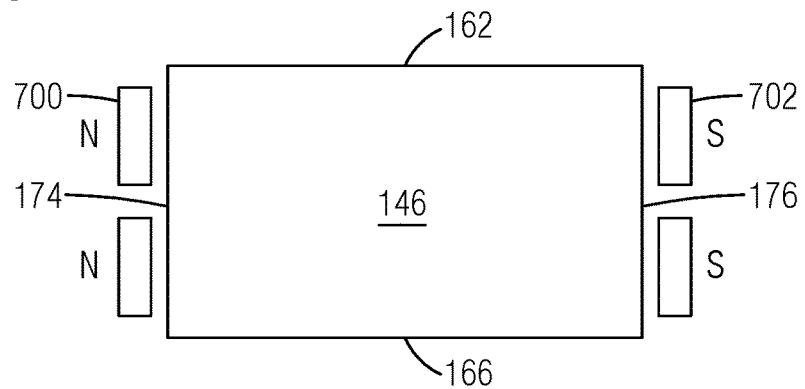
Figure 8:
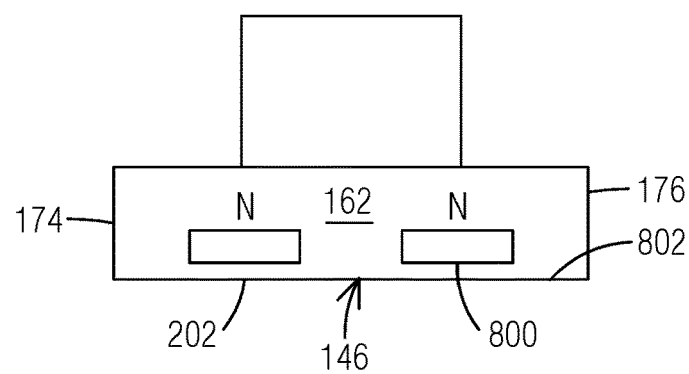
Figure 9:
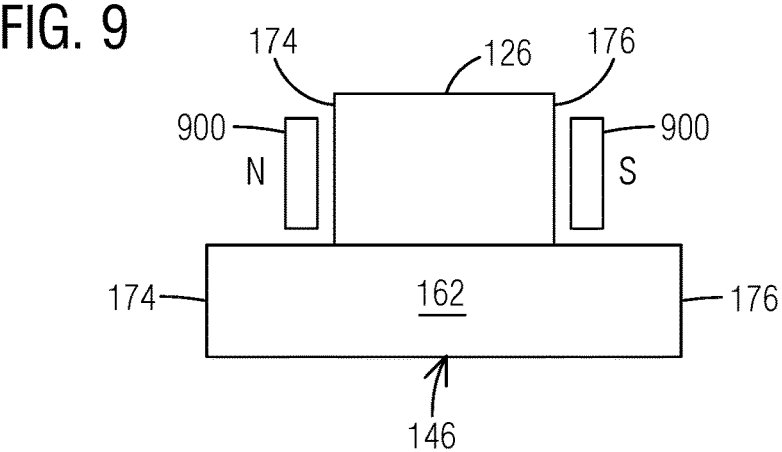

In the example embodiment of FIG. 7, two side magnets 700 are evenly spaced on the side surface 174, and two side magnets 702 are evenly spaced on the side surface 176. In the example embodiment of FIG. 8, at least two bottom magnets 800 are disposed evenly about a top surface 802 of the build platform 202. In the example embodiment of FIG. 9, magnets 900 are disposed on the side surface of the attachment 126.

Additional embodiments include any combination of any of the aspects of the above embodiments. For example, some magnets may be evenly spaced and some not. Also, magnets may be disposed on any combination of sides or the connector etc. The configuration chosen for the magnets depends on the field lines desired by the user. The embodiment of FIG. 4, for example, is optimized for maximum distance length of aligned particles in the x direction to the print head 124. Stacking magnets allows for intermediate field strength, thereby providing for configurations in which the field strength can also be tailored.

Figure 10:
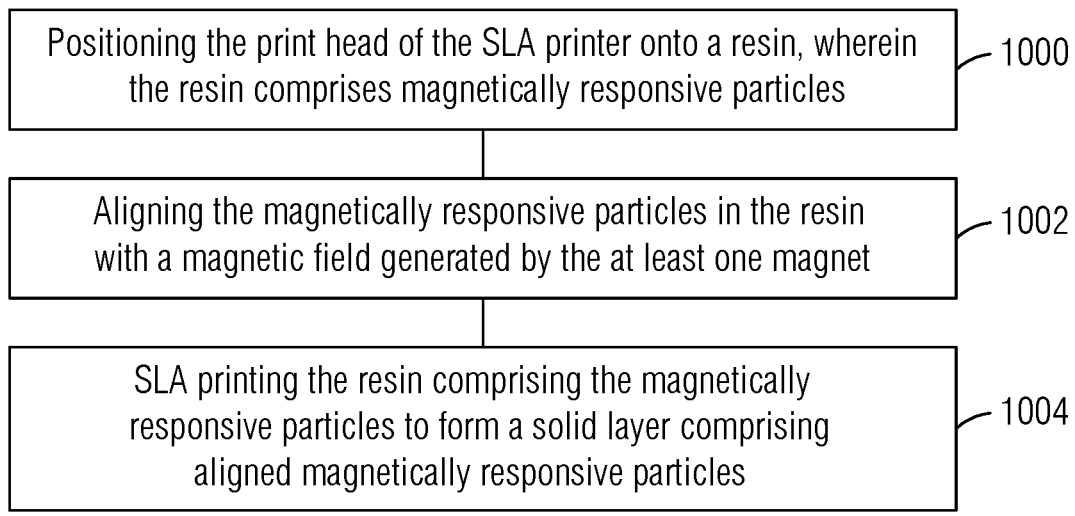
FIG. 10 is a flow chart describing an example embodiment of a method of SLA printing.

FIG. 10 is a flow chart describing an example embodiment of a method of SLA printing. The method includes: 1000 positioning the print head 124 of the SLA printer 102 onto the resin composition 144, wherein the resin composition 144 comprises magnetically responsive particles 150; 1002 aligning the magnetically responsive particles 150 in the resin composition 144 with a magnetic field 154 generated by the at least one magnet 152; and 1004 SLA printing the resin composition 144 comprising the magnetically responsive particles 150 to form a solid layer comprising aligned magnetically responsive particles.

Figure 11:
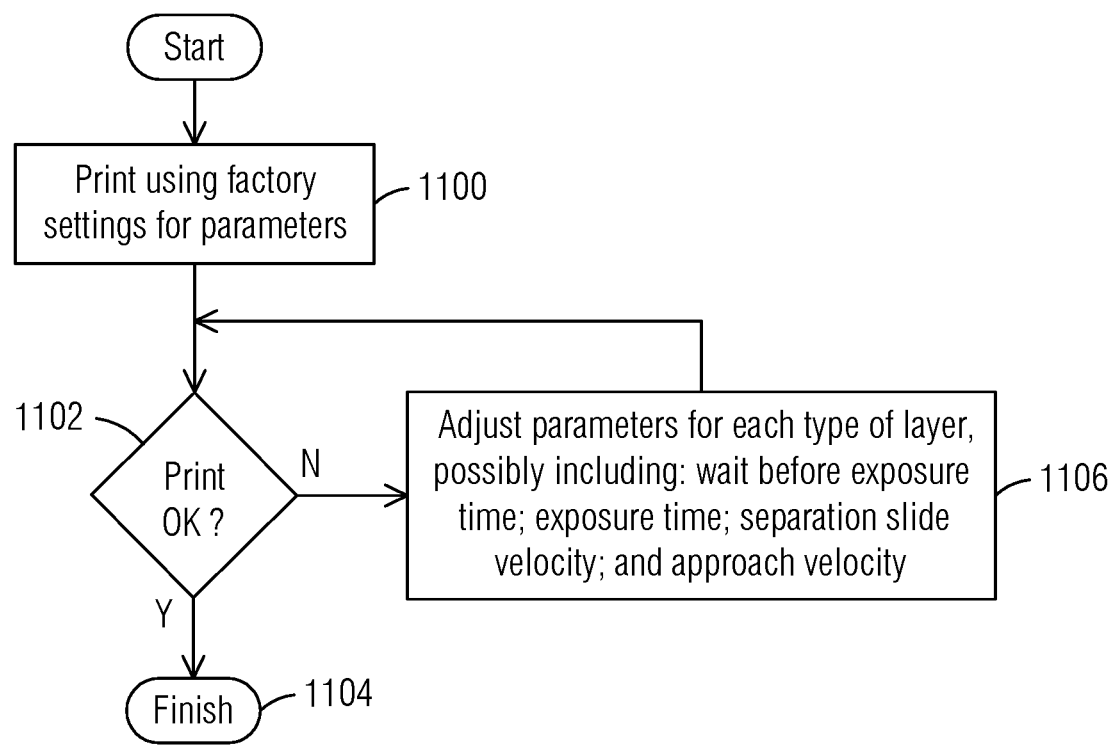
FIG. 11 is a flow chart describing an example embodiment of a method of optimizing a printer to print using the method of FIG. 10.

To aid in achieving the above SLA printing method, the SLA printer 102 may be optimized for use with the print head 124. In an example embodiment, not meant to be limiting, parameters for an Autodesk Ember 3D printer were optimized. FIG. 11 is a flow chart describing an example embodiment of a method of optimizing the SLA printer 102 to print using the method of FIG. 10. The method includes: 1100 print using factory settings for the parameters; 1102 determining if the print is acceptable; if yes, the optimization is complete 1104; if no, 1106 the parameters are adjusted. While all of the parameters may be adjusted to achieve optimized printing, adjustments of certain targeted parameters may expedite optimization. These parameters include: wait before exposure time; exposure time; separation slide velocity; and approach velocity. These parameters may be the same across all layer types, or they may be unique for each layer type.

In an example embodiment using the Autodesk Ember 3D printer, when the solid layer is a first layer, the SLA printing is characterized by: a separation slide velocity of from 0.5 to 1 rpm, and in an example embodiment of 1.0 rpm; and approach slide velocity of from 0.5 to 1 rpm, and in an example embodiment of 1.0 rpm. When the solid layer is a burn in layer, the SLA printing is characterized by: an exposure time of from 5 to 10 seconds depending on the specifics of the equipment and the resin composition, and in an example embodiment of 8.0 seconds; a separation slide velocity of from 0.5 to 1 rpm, and in an example embodiment of 1.0 rpm; and approach slide velocity of from 0.5 to 1 rpm, and in an example embodiment of 1.0 rpm. When the solid layer is a model layer, and wherein the SLA printing is characterized by: a wait before exposure time of from 3 to 10 seconds, and in an example embodiment of 5.0 seconds; an exposure time of from 5 to 10 seconds, and in an example embodiment of 6.0 seconds; a separation slide velocity of from 1 to 2 rpm, and in an example embodiment of 2.0 rpm; and approach slide velocity of between 2 and 4 rpm, and in an example embodiment of 3.0 rpm. While these settings are suitable for the printer of the example embodiment, other printers may require individualized optimization.

To further aid in achieving the above SLA printing method, the resin composition 144 may be optimized for use in the SLA printer 102. In the example embodiment, not meant to be limiting, the resin composition 144 composition was optimized for an Autodesk Ember 3D printer. In the example embodiment, the magnetically responsive particles 150 in the resin composition 144 are iron oxide Fe3O4. However, any magnetically responsive material can be used for the magnetically responsive particles 150. For example, other suitable magnetically responsive particles 150 include magnetite (Fe3O4), maghemite (γ-Fe2O3), as well as other magnetic alloys including CoFe, or other nickel or cobalt alloys.

Figure 12:
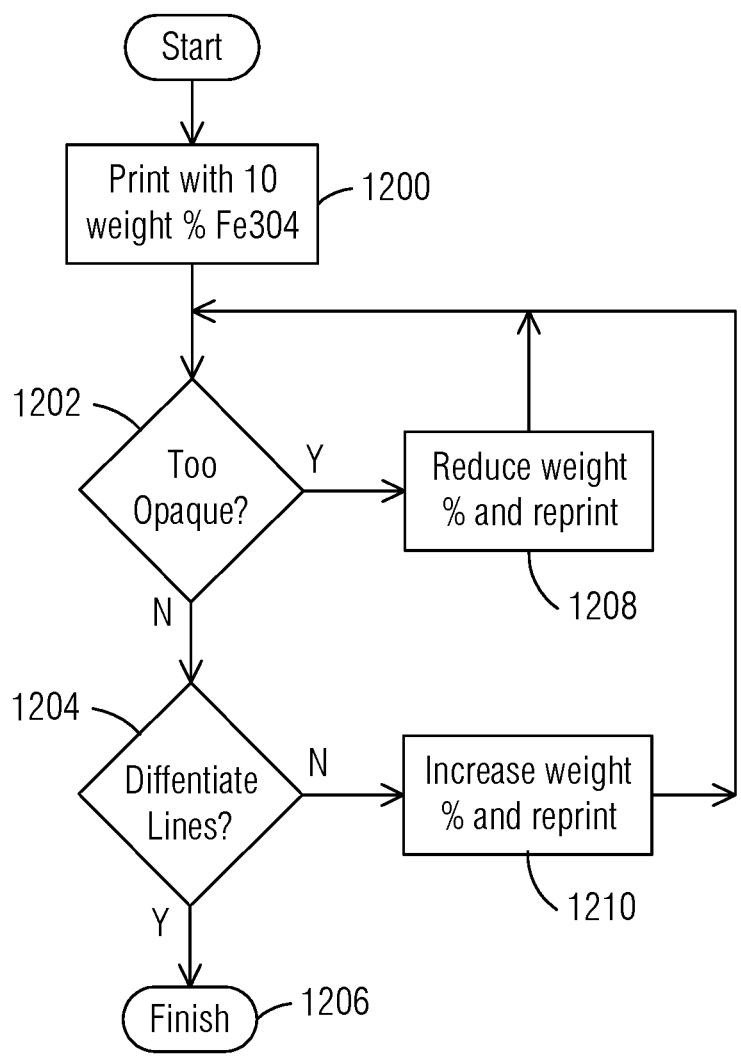
FIG. 12 is a flow chart describing an example embodiment of a method of optimizing resin composition used to print using the method of FIG. 10.

FIG. 12 is a flow chart describing an example embodiment of a method of optimizing resin composition 144 used to print using the method of FIG. 10. The method includes printing with a 10 weight % Fe3O4. While 10 weight % Fe3O4 is used as a starting point in this example, any percentage can be used as the starting point. If 1202 the print is not too opaque, and 1204 if the lines in the print can be differentiated from a control (non-aligned print), then 1206 the composition is optimized. In an example embodiment, the control print is simply a print made using a regular (without magnets) print head 124. If 1202 the print is too opaque, then 1208 the weight % Fe3O4 can be reduced and reprinted until the print is not too opaque. If 1204 the print is not too opaque, but the lines cannot be differentiated from a control (non-aligned print), then the weight % Fe3O4 can be increased and reprinted until the print is both not too opaque and the lines can be differentiated. In the example embodiment, the resin composition 144 comprises a weight % Fe3O4 of between 0.2 and 1.0. In the example embodiment, the resin composition 144 comprises a weight % Fe3O4 of between 0.4 and 0.8. In the example embodiment, the resin composition 144 comprises a weight Fe3O4 of 0.6. While these ranges are suitable for the printer of the example embodiment, other printers may require individualized optimization of the resin composition 144.

The inventors have developed a print head that can be used with a variety of SLA printers and which can print composite resins in which magnetically responsive materials are directionally aligned. The solution is simple, inexpensive, and reliable, and therefore represents an improvement in the art. In addition, the principles discussed above can be readily applied to print heads of different printers.

While various embodiments of the present invention have been shown and described herein, it will be obvious that such embodiments are provided by way of example only. Numerous variations, swapping of features among embodiments, changes, and substitutions may be made without departing from the invention herein. Accordingly, it is intended that the invention be limited only by the spirit and scope of the appended claims.

The invention claimed is:

1. An apparatus, comprising:
a print head comprising: an attachment that is configured to be attached to a movable carriage of a stereolithography 3D printer (SLA printer); and when the print head is installed on the movable carriage: a build platform comprising a bottom surface that faces downward, a front surface that faces a front of the SLA printer, a rear surface that faces a rear of the SLA printer, and side surfaces connecting the front surface to the rear surface; at least one magnet secured to the print head, wherein the at least one magnet comprises at least one magnet secured to the print head via a releasable connection, the releasable connection being configured to releasably secure the at least one magnet secured to the print head via a releasable connection to any of the front surface, the rear surface or at least one side surface of the print head.

2. The apparatus of claim 1, wherein the at least one magnet comprises a permanent magnet.

3. The apparatus of claim 1, wherein the at least one magnet comprises an N52 permanent magnet.

4. The apparatus of claim 1, wherein the at least one magnet comprises an electromagnet.

5. The apparatus of claim 1, wherein the releasable connection comprises double sided tape.

6. The apparatus of claim 1, wherein the releasable connection comprises a connection arrangement comprising a first half secured to the print head and a second half that is configured to releasably attach to the first half and that is secured to the at least one magnet such that the at least one magnet can be positioned anywhere on the first half.

7. The apparatus of claim 6, wherein the connection arrangement comprises a hook and loop fastener.

8. The apparatus of claim 1, wherein the at least one magnet comprises at least two magnets, wherein a front magnet of the at least two magnets is disposed on the front surface and a rear magnet of the at least two magnets is disposed on the rear surface, and wherein at least one of the at least two magnets comprises the at least one magnet secured to the print head via a releasable connection.

9. The apparatus of claim 1, wherein the at least one magnet comprises a plurality of front magnets disposed in a respective pattern on the front surface, and a plurality of rear magnets disposed in a respective pattern on the rear surface, wherein at least one of the plurality of front magnets and plurality of rear magnets comprises the at least one magnet secured to the print head via a releasable connection.

10. The apparatus of claim 1, wherein the at least one magnet comprises a plurality of bottom magnets disposed in a respective pattern on an upper surface of the build platform.

11. The apparatus of claim 1, further comprising the stereolithography 3D printer (SLA printer) comprising the movable carriage.

12. The apparatus of claim 11, wherein the SLA printer is configured to print layers comprising magnetically responsive particles that aligned with a magnetic field created by the at least one magnet during the print process.

13. The apparatus of claim 11, comprising a controller configured to print a resin composition comprising magnetically responsive particles.

\* \* \* \* \*